United States Patent Office 3,488,095
Patented Jan. 6, 1970

3,488,095
BRAKE PRESSURE CONTROL VALVES
Heinrich Bernhard Rath, Tyseley, England, assignor to
 Girling Limited
Filed Apr. 18, 1968, Ser. No. 722,239
Claims priority, application Great Britain, Apr. 21, 1967,
 18,470/67
Int. Cl. B60t *15/06*
U.S. Cl. 303—6      7 Claims

ABSTRACT OF THE DISCLOSURE

The invention relates to hydraulic brake pressure reducer valves of the type having two pistons of different diameters, one of which carries a valve member for opening and closing a passage through the other, so that when the inlet pressure rises, the first piston and valve member move in one direction, against the action of a spring, to close the said passage, whereafter the second piston moves in the opposite direction, against the action of a piston spring. In accordance with a primary feature of the invention, the springs work independently of each other at all times, by virtue of the fact that both pistons are engageable with fixed abutments which limit movement of the pistons towards each other.

To facilitate return of fluid when the inlet pressure is released, a by-pass passage and one-way valve are preferably provided for by-passing the second larger piston. The passage may be formed in the body of the valve, or through one of the movable parts, and the one-way valve may be a spring loaded ball or an elastomeric sealing member.

---

This invention relates to brake pressure control valves and provides a new or improved hydraulic control valve adapted to act as a reducer valve.

The invention relates to hydraulic reducer valves of the general form comprising two pistons of different effective diameter, the first (smaller) of which controls the position of a valve member which controls the flow of liquid through the second piston; the first piston is urged by a control spring in a sense to hold the valve member in its open position, but when the pressure at the inlet of the valve reaches a predetermined value, the first piston is forced outwardly against the action of the control spring, and the valve member prevents further flow of liquid through the second piston. Any further rise in inlet pressure causes the second piston to move (in the opposite direction to the first piston) against the action of a piston spring to transmit pressure at a reduced rate to the outlet of the valve.

The pre-load of the control spring thus determines the pressure at which the valves will close, and the piston spring assists in determining the rate of pressure reduction. An important feature of the invention resides in the construction of a reducer valve so that the pre-loads of the two springs are independent of each other.

In accordance with the invention, there is provided an hydraulic reducer valve comprising a housing having a stepped bore, a solid first piston movable in the smaller diameter portion of the said bore, a second piston having a passage therethrough movable in the larger diameter portion of the said bore, a liquid inlet opening into the bore between the pistons, a liquid outlet opening from the bore outwardly of the second piston, a fixed end wall closing the larger diameter portion of the bore outwardly of the said outlet, an extension to the first piston extending through the said passage and carrying at its free end a valve head for closing the said passage from the outlet side thereof upon outward movement of the first piston in response to a predetermined inlet pressure, control spring means urging the first piston towards the said inlet, and second spring means urging the second piston towards the said inlet, and wherein both pistons have their movement towards the inlet port limited by positive abutment means.

In use, such a valve will normally be interposed in the pressure line between a master cylinder, or other pressure source, and one brake or set of brakes, usually the rear brakes of the vehicle.

Some reducer valves in accordance with the invention will now be described, by way of example only, with reference to the accompanying drawings, in which:

FIGURES 3 and 4 are axial sections of internal modifications, and

Figure 1:
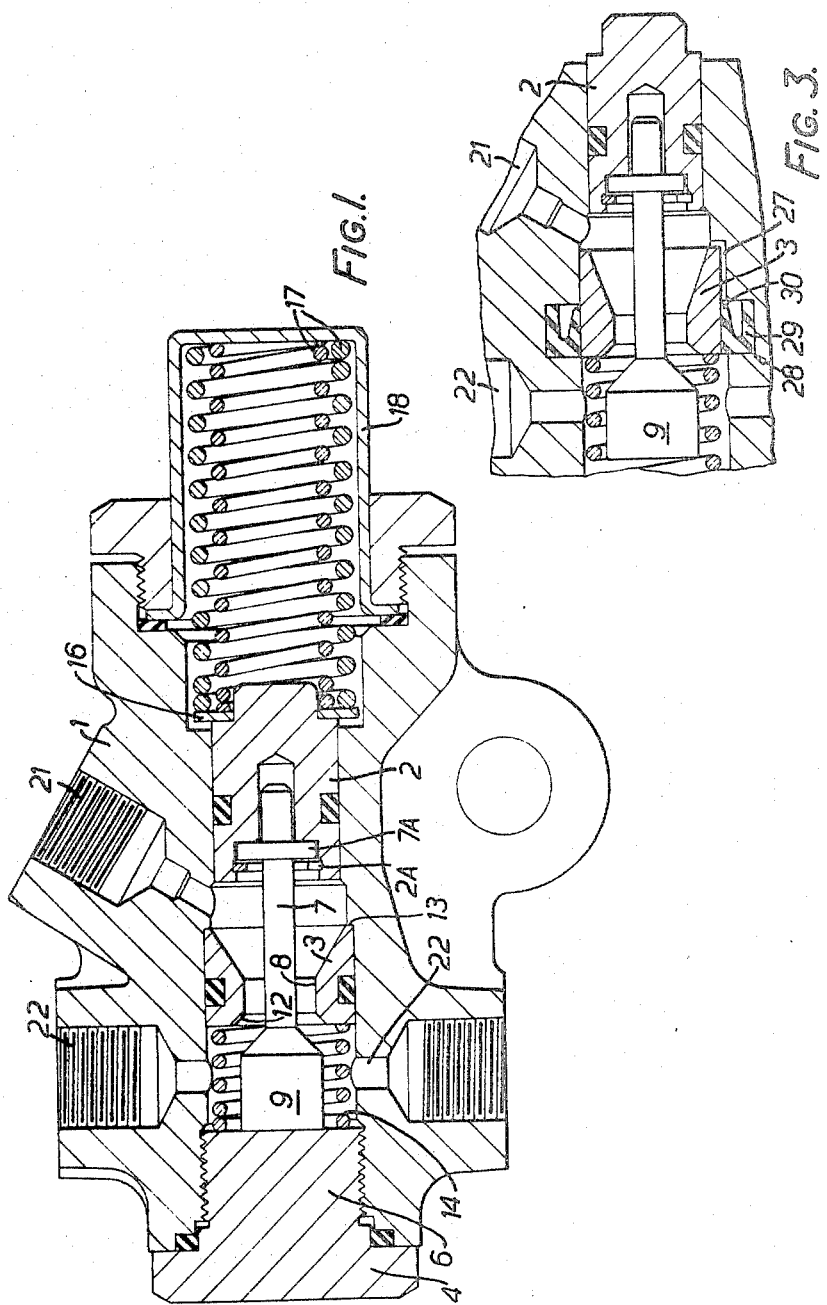
FIGURES 1 and 2 show two forms of reducer valve in axial cross-section.

The control valve shown in FIGURE 1 comprises a housing 1 having a stepped bore which houses, a first, solid piston 2 of smaller diameter and a second, annular piston 3 of larger diameter. At its larger diameter (left hand) end, the bore is closed by a fixed end wall in the form of a closure plug 4 formed internally of the valve with a fixed abutment 6. The piston 2 has an extension 7 extending through the central passage 8 of the piston 3 and carries at its free end a valve member 9 adapted to co-operate with a part-conical valve seating 12 formed at the adjacent end of the passage 8.

The piston 3 is normally held against a stop, formed by shoulder 13, by a light coil compression spring 14. The outer end of the solid piston 2 is engaged by a plate 16 abutted by one end of a pair of control springs 17 located in a cup 18 secured to the outer end of the housing 1. The springs 17 urge the piston 2 inwardly, such movement being limited by engagement of the valve member 9 with the abutment 6, as shown. The positions of the pistons in the inoperative condition is precisely determined by the abutment 6 and shoulder 13, and an inlet port 21 is formed by a simple drilling at a point between the two pistons in this position. This avoids the necessity, inherent in some valves, of machining extra passages to ensure free flow in the inoperative conditions.

The housing is also formed with a pair of outlet ports 22 communicating with a larger diameter end portion of the bore, outwardly of the piston 3. In use, the inlet may be connected to a brake master cylinder and the outlets to, say, the rear brakes of the vehicle.

On application of the brakes, fluid is initially able to flow freely through the passage 8 from the inlet to the outlet. At a predetermined pressure, the fluid pressure overcomes the action of the control spring 17 and forces the piston 2 outwardly, pulling the valve member 9 into sealing engagement with the valve seating 12 and thus isolating the inlet from the outlet. Any further increase in the inlet pressure forces both pistons to the left, and by virtue of the difference in effective area of the two pistons, and the action of the coil spring 14, this pressure increase is transmitted to the outlet at a reduced rate.

It should be noted that the extension 7 is coupled to the piston 2 in a manner accommodating a degree of eccentricity or angularity between the first and second pistons, by virtue of a collar 7A on the extension being loosely engaged behind a spring-clip 2A in the piston 2. Other methods of coupling the extension and piston could, of course, be employed.

Figure 2:
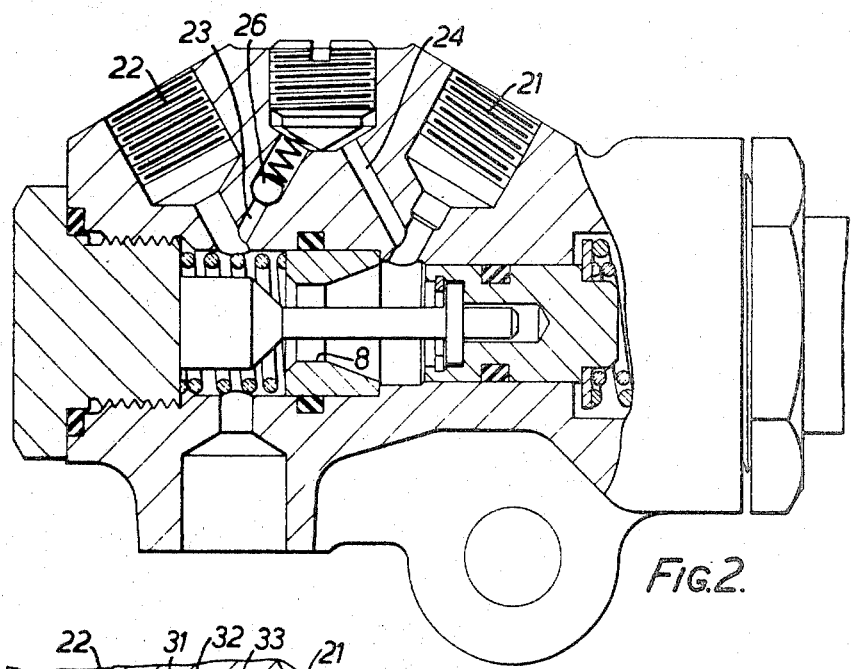

In the valve shown in FIGURE 2, a by-pass passage is formed in parallel with the passage 8 through piston 3 and incorporating a check valve for closing the by-pass passage until the outlet pressure exceeds the inlet pressure, whereupon the by-pass opens for the rapid release of the outlet pressure when the inlet pressure is relieved.

The passage comprises interconnected drillings 23, 24 in one of which is positioned a spring loaded valve ball 26 forming the check valve.

In the valve of FIGURE 3, rapid pressure release is ensured by a by-pass passage in the form of an axial groove 27 in the larger bore adjacent the piston 3. A piston sealing ring 28 received in a circumferential groove in the bore has an outer lip 29 and an inner lip 30 which normally blocks the groove 27, between the ends of the groove, but is yieldable under the action of a higher pressure on the outlet side of the sealing ring.

Figure 4:
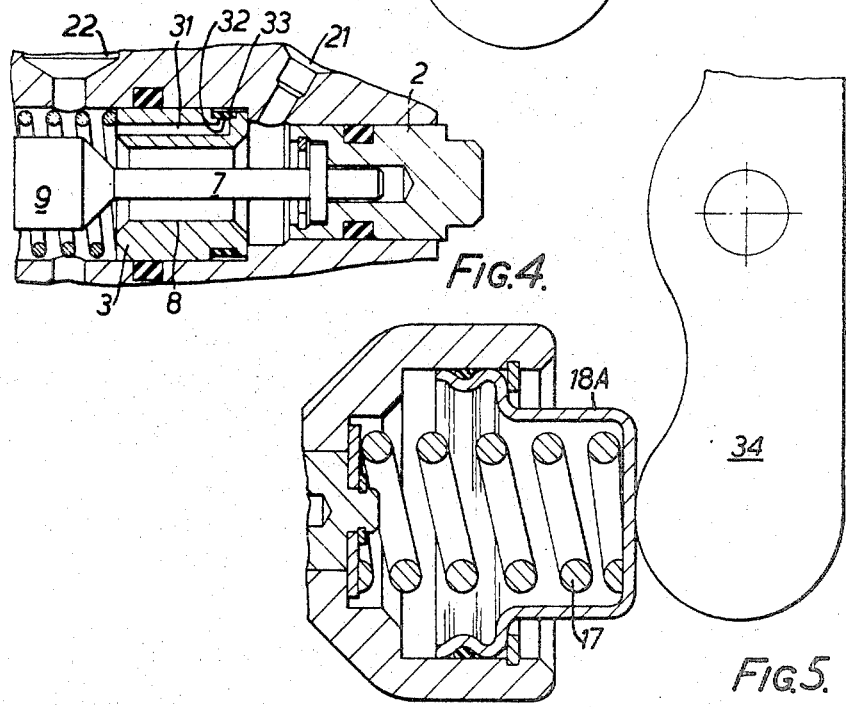

In FIGURE 4, the by-pass passage is formed through the piston 3 by an axially directed bore 31 open at its left hand end, and leading at its other end to the radially inner end of a radial bore 32. The outer end of the radial bore is normally closed by a band-like seal 33 of elastomeric material which can yield to permit the flow of higher pressure liquid from the outlet side of piston 3 to the inlet side.

In another arrangement, not illustrated, a by-pass passage is formed through the valve head 9 and extension 7 and is provided with a spring loaded valve member to act as a check valve.

Figure 5:
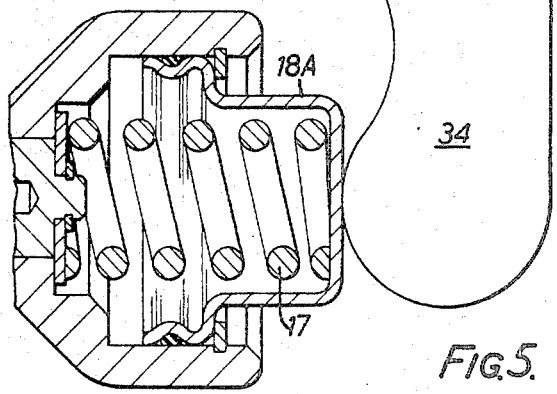
FIGURE 5 shows a further modification, also in axial cross-section.

In the modified valve shown in FIGURE 5 the fixed cup 18 of FIGURES 1 and 2 is replaced by an axially movable cup 18A engageable externally by a lever 34. With the housing mounted on either a sprung or an unsprung vehicle part, the lever 34 is connected through a suitable linkage (not shown) to an unsprung or a sprung vehicle part, respectively, in such a manner that an increase in vehicle loading further compresses the control spring 17 whereby to increase the "cut-off" pressure at which the valve will begin to act as a reducer valve.

I claim:

1. An hydraulic reducer valve comprising a housing having a stepped bore, a solid first piston movable in the smaller diameter portion of the said bore, a second piston having a passage therethrough and movable in the larger diameter portion of the said bore, a liquid inlet opening into the bore between the pistons, a liquid outlet opening from the bore outwardly of the second piston, a fixed end wall closing the larger diameter portion of the bore outwardly of the said outlet, an extension to the first piston extending through the said passage and carrying at its free end a valve head for closing the said passage from the outlet side thereof upon outward movement of the first piston in response to a predetermined inlet pressure, control spring means urging the first piston towards the said inlet, and second spring means urging the second piston towards the said inlet, and positive abutment means for limiting movement of both pistons towards the inlet port, the abutment means for said first piston being afforded by engagement of said extension with said end wall.

2. A valve in accordance with claim 1, wherein said control spring means comprises a coil compression spring working between an abutment at the outer end of said first piston and a closure removably mounted on the housing.

3. A valve in accordance with claim 1, wherein the said extension is formed seperately from the first piston, and is connected thereto in a manner accommodating a degree of eccentricity between the first and second pistons.

4. A valve in accordance with claim 1, including a by-pass passage in parallel with the passage through said second piston and having a check-valve for closing said by-pass passage until the outlet pressure exceeds the inlet pressure of the valve.

5. A valve in accordance with claim 4, wherein the said by-pass passage comprises passage means formed in the body of the said housing and incorporating a spring loaded valve ball preventing flow in one direction, from the outlet side of said second piston to the inlet side.

6. A valve in accordance with claim 4, wherein said by-pass is formed by an axially extending groove in the larger diameter bore adjacent said second piston, said groove normally being blocked between its ends by an annular seating member, set in a circumferential groove in the bore, which member is adapted to yield under the action of a higher pressure on its outlet side.

7. A valve in accordance with claim 4, wherein the said by-pass is formed through the second piston, and comprises an axially directed bore open at one end to the outlet side of the piston and leading at its other end to the inner end of a radial bore, the outer end of which is normally closed by a ring of elastic material carried by the second piston, which ring is yieldable to permit the passage of higher pressure fluid through the axial and radial bores to the inlet side of the piston.

References Cited

UNITED STATES PATENTS

| 1,416,590 | 5/1922 | Wilhelms | 251—88 |
| 3,329,471 | 7/1967 | Oberthur | 303—22 |
| 3,358,445 | 12/1967 | Wallace | 60—54.5 |
| 2,408,513 | 10/1946 | Gunderson. | |

MILTON BUCHLER, Primary Examiner

JOHN J. McLAUGHLIN, Jr., Assistant Examiner

U.S. Cl. X.R.